United States Patent [19]

Lee

[11] 4,151,218

[45] Apr. 24, 1979

[54] FIRE RETARDANT POLYMERS OF STYRENE AND MALEIC ANHYDRIDE

[75] Inventor: Yoon C. Lee, Springfield, Mass.

[73] Assignee: Monsanto Company, St. Louis, Mo.

[21] Appl. No.: 644,491

[22] Filed: Dec. 29, 1975

[51] Int. Cl.² .................... C08K 5/06; C08K 5/03; C08K 5/02

[52] U.S. Cl. .................. 260/836; 260/45.7 R; 260/45.75 B; 260/45.75 D; 260/45.75 R; 260/897 C; 260/899; 260/897 B

[58] Field of Search ............ 260/836, 45.75, 45.7 RL, 260/78.5 R, 897 C, 899, 897 B

[56] References Cited

U.S. PATENT DOCUMENTS

| | | | |
|---|---|---|---|
| 3,442,980 | 5/1969 | Grabowski | 260/45.7 |
| 3,639,299 | 2/1972 | MacDowall | 260/45.7 |
| 3,794,616 | 2/1974 | Dennis et al. | 260/45.7 |
| 3,862,070 | 1/1975 | Fukushima et al. | 260/45.7 |
| 3,867,327 | 2/1975 | Lawson et al. | 260/45.7 |
| 3,897,387 | 7/1975 | O'Shaughnessy | 260/45.7 |

OTHER PUBLICATIONS

The Chemistry & Uses of Fire Retardants by Lyons, 1970, pp. 80 to 88, Wiley-Interscience, N.Y.C.
Flammability of Solid Plastics-vol. 7, Technomic Pub. Co., Westport, Conn. 1974, pp. 263-275.

*Primary Examiner*—Veronica P. Hoke
*Attorney, Agent, or Firm*—David Bennett; William J. Farrington; James C. Logomasini

[57] ABSTRACT

Disclosed herein are fire retardant polymers of styrene and maleic anhydride. These polymers when formulated with various additives, have a UL-94 rating of at least V-1. The polymers are especially useful for use in radio and T.V. cabinets, furniture, appliance housings and other similar applications.

11 Claims, No Drawings

FIRE RETARDANT POLYMERS OF STYRENE AND MALEIC ANHYDRIDE

BACKGROUND OF THE INVENTION

1. Field of the Invention

The present invention relates to polymers prepared from styrene and maleic anhydride (SMA) which are formulated to obtain fire retardant compositions.

2. Description of the Prior Art

Polystyrene (PS) and styrene-maleic anhydride copolymers (SMA) are well known and are widely used in the prior art. Polymers which are prepared using a comonomer such as acrylonitrile with the styrene and styrene-maleic anhydride polymers are also known in the art. These polymers tend to burn readily and are not generally recommended for use in those application requiring fire retardant polymers.

There exists in the art a need for styrene-maleic anhydride (SMA) based molding compositions which are fire retardant. This need is accented by the increasing number of laws and regulations relating to the fire retardant properties of polymers used to prepare fire retardant polymers which go into furniture, such as radio and television cabinets, tables, chairs, appliance housings, and other related uses.

SUMMARY OF THE PRESENT INVENTION

The above need in the prior art is fulfilled by the present invention which provides fire retardant styrene-maleic anhydride copolymer (SMA) based compositions which exhibit flame spread ratings of at least V-1 as determined by the UL-94 test and smoke evolution ratings of less than 450 Dm flaming. These compositions comprise:

A. a rubber modified copolymer of a styrene monomer and maleic anhydride containing from 7 to 25 percent by weight of maleic anhydride based on the weight of the copolymer; wherein the rubber is selected from the group consisting of polyepichlorohydrin rubbers, polychloroprene rubbers, chlorinated polyethylene rubbers and ethylene vinyl acetate rubbers; wherein the amount of rubber used is in the range of from 1 to 30 percent by weight based on the weight of the styrene-maleic anhydride copolymers; with the proviso that when using an ethylene vinyl acetate rubber, the maleic anhydride content of the polymer is at least 10 percent by weight;

B. from 7.5 to 15 percent by weight, based on the total weight of the composition, of an aromatic bromine compound which will provide at least 6 percent by weight of bromine to the composition;

C. from 3 to 12 percent by weight, based on the total weight of the composition, of a metal oxide selected from the group consisting of $Sb_2O_3$, $Bi_2O_3$, $MoO_3$, $SnO_2$ and $WO_3$;

D. from 3 to 25 percent by weight, based on the total weight of the composition of a smoke suppressant selected from the group consisting of dawsonite, magnesium carbonate, alumina trihydrate, calcium carbonate, magnesium borate and mixtures thereof.

DESCRIPTION OF THE PREFERRED EMBODIMENTS

The styrene-type monomers used in the present invention include styrene, alpha-methylstyrene, and halogenated styrenes such as o-, p-, and m-chlorostyrenes, o-, p-, and m-bromostyrenes, etc. The amount of styrene-type monomer used in the present invention is from 75 to 93 percent by weight based on the weight of the total polymer composition. Up to 30 percent by weight of the styrene monomer can be replaced by other suitable monomers such as acrylonitrile, methacrylonitrile and methylmethacrylate.

The amount of maleic anhydride used in the present invention is in the range of from 7 to 25 percent by weight, preferably 10 to 21 percent by weight based on the total polymer composition. The maleic anhydride monomer used may be replaced in whole or in part by monochloromaleic anhydride and bromomaleic anhydride. The dichloromaleic anhydride was found to be unsuitable because of excessive brittleness in the polymer which also had poor processability. The maleic anhydride monomers used contribute to lower smoke levels for the polymer, raise the heat distortion temperature of the polymer and reduce the tendency of the styrene polymer to drip during the flame tests.

The polymers of the present invention are prepared by conventional mass or solution polymerization techniques. Aqueous polymerization methods are not normally employed because the water would hydrolyze the anhydride group.

The styrene-maleic anhydride polymers used in the present invention are compounded with various additives in order to obtain the required fire retardant and smoke evolution properties. A description of the preferred additives is set forth below.

HALOGEN ADDITIVES

The preferred halogenated fire retardant additives used with the styrene-maleic anhydride polymers are those which contain one or more bromine atoms attached to an aromatic nucleus. One such class of these compounds may be represented by the following general formula:

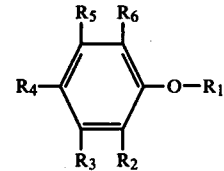

in which $R_1$ is an aromatic group which may be brominated and/or chlorinated or a straight chain or branched alkyl group containing from 2 to 12 carbon atoms and may contain an OH group, and $R_2$ to $R_6$ stand for a member of the group consisting of hydrogen, chlorine and bromine, said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether and decabromodiphenylether. The halogen atoms of these diaromatic ethers may be distributed in any arrangement on the aromatic rings.

Examples of suitable aromatic-aliphatic ethers are the 2-ethyhexyl-, n-octyl, nonyl-, butyl-, dodecyl-, and 2,3-dioxopropyl ethers of tribromophenyl, tribromochlorophenyl and tribromodichlorophenyl. The most preferred compound is decabromodiphenyl ether. Other suitable aromatic bromine compounds are well known to those skilled in the art or will become obvious upon reading the present specification.

Other suitable aromatic bromine compounds are described in U.S. Pat. Nos. 3,833,538; 3,849,369, British Pat. No. 1,372,120 and West German patent publication Nos. 2,328,517, 2,328,520 and 2,328,535, which are incorporated herein by reference.

The amount of halogenated fire retardant additives used is in the range of from 7.5 to 15 percent by weight, preferably 7.5 to 12 percent by weight in order to provide an effective amount of halogen. The minimum effective level of bromine is about 6 percent by weight based on the weight of the polymer composition.

SYNERGISTS

Examples of synergists used in combination with the halogen fire retardant additive in order to obtain improved fire retardant properties include metal oxides such as $Sb_2O_3$, $Bi_2O_3$, $MoO_3$, $SnO_2$, $WO_3$ and the like. The preferred metal oxide is $Sb_2O_3$. These metal oxides (especially antimony oxide) function as synergists in improving the efficiency of the halogen in imparting flame retardancy to the above mentioned polymers. The amount of metal oxide used with the polymers of this invention will be from 1 to 15 percent by weight, preferably 3 to 12 percent by weight, based on the total weight of the formulated composition.

SMOKE SUPPRESSANTS

The polmeric compositions of the present invention may be further modified with smoke suppressants in order to enhance fire retardant properties and/or smoke evolution properties. Examples of suitable smoke suppressants would include hydrates, carbonates and borates such as alumina trihydrate, sodium aluminum carbonate hydroxide (dawsonite), magnesium carbonate, hydrated magnesia, hydrated calcium silicate, hydrated calcium borate, calcium carbonate, and magnesium borate. One of the preferred smoke suppressants is dawsonite, [Na Al $Co_3(OH)_2$] which is available commercially from Alcoa. Mixtures of the above smoke suppressants are also effective. The amount of smoke suppressant used in this invention will be from 3 to 25 percent by weight, preferably from 5 to 20 percent by weight based on the total weight of the formulated composition.

In addition to acting as smoke suppressants, the magnesium carbonate and/or magnesium borate are also believed to react with the sodium oxide generated by the dawsonite thereby keeping the sodium oxide from reacting with and tying up the fire retarding halogens. Thus, when using small amounts of the carbonate or borate, e.g., from 3 to 15 percent by weight based on the formulated composition, in combination with the dawsonite, more of the halogen atoms in the composition will be more readily available to function as a flame retardant. Alternately, when using dawsonite and other such compounds, one can increase the amount of halogen used in order to compensate for that which may be tied up by the dawsonite. The preferred smoke suppressant system is a combination of magnesium carbonate and dawsonite wherein the ratio of magnesium carbonate to dawsonite is at least 1:1.

RUBBER MODIFIERS

The SMA polymers of the present invention contain from 1 to 30 percent and more preferably from 5 to 20 percent by weight of a rubber component which is used to strengthen or toughen the SMA polymer. Examples of the rubber components used include polymers and copolymers of chloroprene, epichlorohydrin, rubbery ethylene-vinyl acetate and chlorinated polyethylene. The percent rubber referred to above is that of the rubber substrate based on the total polymer composition.

The rubbery component may be incorporated into the matrix polymer by any of the methods which are well known to those skilled in the art, e.g., direct polymerization of monomers, grafting the styrene, maleic anhydride and mixtures thereof onto the rubbery backbone, forming a polyblend of a rubber graft polyer with a matrix polymer, etc.

The preferred rubber components are the halogenated rubbers such as epichlorohydrin rubbers, polychloroprene rubbers, chlorinated and ethylene vinyl acetate rubbers. When using ethylene vinyl acetate rubbers at least 10 percent by weight of maleic anhydride is required in order to obtain the desired fire and smoke properties. The chlorinated rubbers provide additional halogen to the system while the epichlorohydrin and ethylene vinyl acetate rubbers have the advantage of lower smoke evolution.

The polychloroprene rubber component preferred for use in the present invention is polychloroprene or a copolymer of chloroprene and at least one other monomer such as butadiene, acrylonitrile, methacrylonitrile, styrene, ring substituted halostyrene, alpha-halostyrene, ring substituted alkylstyrene, alpha-alkylstyrene, vinyl chloride, etc. The amount of comonomer used is in the range of 0 to 20 percent based on the weight of polychloroprene rubber copolymer.

Chloroprene rubbers are commercially available as solid rubbers, rubber latices (also referred to as emulsions) and solutions. The preferred polychloroprene rubbers used in the present invention are those in solid form or in organic solvent solutions as those in latex form must be recovered from the latex and dried prior to use. The chloroprene rubber used is cross-linked either before or during processing in order to maintain its particulate nature. Chloroprene rubbers are available from the E. I. duPont de Nemours & Company, Wilmington, Del. and from Petro-Tex Chemical Corporation of Houston, Tex.

The preferred epichlorohydrin rubbers are polyepichlorohydrin and copolymers of epichlorohydrin with alkylene oxides such as ethylene and propylene oxides. These rubbers are available commercailly as Hydrin Elastomers from B. F. Goodrich Chemical Company.

The rubber component is selected to provide a balance of good physical properties such as impact and gloss. Ungrafted rubber can be used in the present invention. However, when using polychloroprene, rubber which has been grafted with a polymer composition similar to that used for the matrix polymer is preferred. The grafted rubber provides better impact strength and fire retardancy because the graft improves the degree of dispersion of the polychloroprene in the polyblend.

Polychloroprenes are conventionally grafted by dissolving or dispersing the rubber in the monomers to be grafted onto the rubber. The percent of monomer grafted onto the polychloroprene rubber can be varied from about 10 to 100 percent depending on the properties desired. The percent graft is defined as the weight percent of monomers grafted onto the rubber particle, based on the weight of the rubber, e.g., 100 grams of rubber grafted with 100 grams of monomer has 100 percent of grafted monomers. The preferred graft level range is from 10 to 50 percent in order to obtain optimum compatibility and good gloss. Preferably, the grafted rubber has a particle size in the range of from 0.1 to 20 microns, more preferably from 1 to 10 microns for optimum gloss and toughness.

The type and amount of monomers described above in reference to the preparation of the SMA matrix polymer are used in the graft polymerization of the polychloroprene rubbers.

TEST PROCEDURES

Underwriter's Laboratory UL-94 Test (1)

(1) The numerical flame spread ratings reported herein are not intended to reflect hazards presented by the presently claimed polyblends or any other materials under actual fire conditions.

Fire retardant properties are measured using the "Test for Flammability for Plastic Materials—UL-94", Sept. 17, 1973. The test is carried out on test specimens 6"×$\frac{1}{2}$"×$\frac{1}{8}$". When other sample thicknesses are used the stated thickness is given.

The test specimen is supported from the upper end, with longest dimension vertical, by a clamp on a ring stand so that the lower end of the specimen is $\frac{3}{8}$" above the top of the burner tube. The burner is then placed remote from sample, ignited, and adjusted to produce a blue flame, $\frac{3}{4}$" in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming combustion of the specimen stops. The test flame is again withdrawn, and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of five specimens (10 flame applications) shall not exceed 25 seconds (maximum not more than 30 seconds), and the portion of the specimen outside the clamp shall not be completely burned in the test.

Materials which comply with the above requirements and do not drip any flaming particles or droplets during the burning test will classify as V-1 according to the nomenclature used in the UL-94 test.

Materials which comply with the above requirements, but drip flaming particles or droplets which ignite cotton fibers will classify as V-2 according to the nomenclature used in the UL-94 test.

Class V-0 is given to materials wherein the duration of flaming averages less than 5 seconds under the conditions above with no ignition burning more than 10 seconds.

SMOKE EVOLUTION TESTS

The method used for measuring smoke evolution is that described in D. Gross, J. J. Loftus and A. F. Robertson, "Method for Measuring Smoke from Burning Materials," Symposium on Fire Test Methods—Restraint and Smoke, 1966, ASTM STP 422, Am. Soc. Testing Mats., 1967, p. 166.

The following examples are set forth in illustration of the present invention and are not to be construed as a limitation thereof. Unless otherwise indicated all parts and percentages are by weight.

EXAMPLES 1 to 4

Examples 1 to 4 illustrate the effect of various amounts of maleic anhydride on the smoke evolution in styrene-maleic anhydride copolymers during fire retardant tests. The polystyrene and styrene-maleic anhydride (SMA) copolymers tested are prepared by conventional techniques. These polymers are then formulated as follows:

| Polymer | 77 | parts |
|---|---|---|
| Antimony Oxide | 4 | parts |
| Decabromodiphenyl Oxide | 9 | parts |
| Dawsonite | 5 | parts |
| Magnesium Carbonate | 5 | parts |
| | 100 | parts |

The decabromodiphenyl oxide is a conventional fire retardant additive, which is available commercially as Dow FR-300-BA from the Dow Chemical Company. The antimony oxide is a synergist for the decabromodiphenyl oxide. The dawsonite and magnesium carbonate are smoke suppressants.

The ingredients are compounded on a mill roll at temperatures in the range of 160 to 195° C. and then compression molded into test specimens using temperatures in the range of 175 to 195° C. and pressures of about 4000 to 5000 psi (281 to 351 kg/sq.cm.). The molded specimens are then tested for flame and smoke properties using the tests described above. The results of these tests are tabulated in Table I below.

TABLE I

| | SUMMARY OF EXAMPLES 1 to 4 | | | | |
|---|---|---|---|---|---|
| Example | % Maleic Anhydride in Polymer | Dm (1) | UL-94 Rating | Dripping Behavior | AFOT (2) |
| 1 Polystyrene | 0 | 550(284) | Fail | Drips heavily | 35 |
| 2 SMA | 7 | 518(226) | Fail | Drips slightly | 35 |
| 3 SMA | 14 | 472(213) | V-O | None | 2 |
| 4 SMA | 21 | 330(162) | V-O | None | 2 |

(1) The first number is under flaming while the second number in parenthesis is under nonflaming (smoldering) conditions.
(2) Approximate flame out times.

Referring to Table I above, as the amount of maleic anhydride increases from 0 to 14 percent, the UL rating and approximate flame out times (AFOT) become significantly better. In this regard the polystyrene of Example 1 and the styrene-maleic anhydride copolymer of Example 2 which only contain 7 percent by weight of maleic anhydride should be compared with Examples 3 and 4 which contain 14 and 21 percent of maleic anhydride. In addition, there is less smoke evolved and less tendency for the polymer to drip when using increasing amounts of maleic anhydride.

All of the above samples contain 9 parts of a decarbromodiphenyl oxide fire retardant additive, which provides 7.4 percent bromine to the composition. Even at these bromine levels Examples 1 and 2 fail the UL-94 test. However, it should be noted that when Examples 1 and 2 were repeated without the dawsonite they passed the UL-94 test but dripped heavily and gave off greater amounts of smoke.

EXAMPLES 5 to 12

These examples illustrate the use of a chlorinated rubber with the interpolymers of the present invention. A high impact polystyrene (HIPS) sample, which contains about 9 percent by weight of a grafted butadiene-styrene rubber, is included for control purposes. The rubber used is Hydrin 100, a polyepichlorohydrin homopolymer which is available commercially from B. F. Goodrich Company. The rubber component is shredded and mill rolled with the matrix polymers at temperatures in the range of from 160° C. to 195° C. The mill rolled samples are ground and formulated with various amounts of antimony oxide, dawsonite, magnesium carbonate and decabromodiphenyl oxide. The formulated samples are then compression molded and tested for flame and smoke properties. The composition tested and results of these test are tabulated in Table II below.

EXAMPLES 13 to 18

These examples illustrate the use of an ethylene-vinyl acetate rubber in place of the epichlorohydrin rubber used in Examples 5 to 12. The general formulation and testing procedures used in Examples 5 to 12 are repeated here except that the rubber component is an ethylene-vinyl acetate rubber which contains 27 to 29 percent by vinyl acetate. This material is available commercially as ELVAX from E. I. duPont de Nemours & Co.

TABLE III

| SUMMARY OF EXAMPLES 13 to 18 | | | | | | |
|---|---|---|---|---|---|---|
| Example | 13 | 14 | 15 | 16 | 17 | 18 |
| % MA in SMA | 7 | 7 | 14 | 14 | 21 | 21 |
| Formulations Tested | | | | | | |
| SMA Matrix Polymer (parts) | 53.4 | 52 | 56 | 62 | 56 | 62 |
| EVA Rubber (parts) | 23 | 20 | 16 | 15 | 16 | 15 |
| Antimony oxide (parts) | 4.3 | 4 | 4 | 4 | 4 | 4 |
| (parts) | — | 10 | 5 | 5 | 5 | 5 |
| Magnesium Carbonate (parts) | 10.2 | — | 10 | 5 | 10 | 5 |
| Decabromodiphenyl oxide (parts) | 8.8 | 9 | 9 | 9 | 9 | 9 |
| % Bromine | 7.3 | 7.47 | 7.47 | 7.47 | 7.47 | 7.47 |
| % Rubber | 23 | 20 | 16 | 15 | 16 | 15 |
| Test Results | | | | | | |
| UL-94 | V-2 | Fails | V-0 | V-0 | V-0 | V-0 |
| AFOT (seconds) | 14 | Burns | 1 | 1 | 1 | 1 |
| Dm (Flaming) | 554 | 360 | 354 | 405 | 374 | 354 |
| (Non-flaming) | 163 | 133 | 133 | 154 | 154 | 133 |
| Dripping | Slightly | None | None | None | None | None |

Note that Examples 13 and 14 do not qualify for the V-1 rating notwithstanding the fact that they contain approximately 9 parts by weight of the decabromodiphenyl oxide fire retardant additive. When the maleic anhydride content is increased to 14 percent, the samples have a V-0 rating and smoke levels of less than 400. These examples show the need for using maleic anhydride levels of at least 10 percent when using an ethylene vinyl acetate rubber.

TABLE II

| SUMMARY OF EXAMPLES 5 to 12 | | | | | | | | |
|---|---|---|---|---|---|---|---|---|
| Example | 5 (Control) | 6 (Control) | 7 | 8 | 9 | 10 | 11 | 12 |
| Polymer tested | HIPS | Polystyrene | SMA | SMA | SMA | SMA | SMA | SMA |
| % MA in SMA | 0 | 0 | 7 | 7 | 14 | 14 | 21 | 21 |
| Formulations Tested | | | | | | | | |
| Polymer (parts) | 77 | 62 | 62 | 56 | 62 | 56 | 56 | 62 |
| Epichlorohydrin Rubber(pts) | 0 | 15 | 15 | 16 | 15 | 16 | 16 | 15 |
| Antimony oxide (parts) | 4 | 4 | 4 | 4 | 4 | 4 | 4 | 4 |
| Dawsonite (parts) | 5 | 5 | 5 | 5 | 5 | 5 | 5 | 5 |
| Magnesium Carbonate(parts) | 5 | 5 | 5 | 10 | 5 | 10 | 10 | 5 |
| Decabromodiphenyl oxide(pts) | 9 | 9 | 9 | 9 | 9 | 9 | 9 | 9 |
| % Bromine | 7.47 | 7.47 | 7.47 | 7.47 | 7.47 | 7.47 | 7.47 | 7.47 |
| % Chlorine | 0 | 5.7 | 5.7 | 6.08 | 5.7 | 6.08 | 6.08 | 5.7 |
| Test Results | | | | | | | | |
| UL-94 | Fails | V-O | V-O | V-O | V-O | V-O | V-O | V-O |
| AFOT (seconds) | Burns | 3 | 1 | 1 | 1 | 1 | 1 | 1 |
| Dm (Flaming) | 600 | 505 | 475 | 423 | 425 | 342 | 287 | 315 |
| (Non-flaming) | 290 | 295 | 279 | 379 | 300 | 300 | 160 | 160 |
| Dripping | Heavy | Heavy | None | None | None | None | None | None |

Referring to Table II above, Examples 7 to 12 show the advantage of increasing maleic anhydride content in order to obtain reduced smoke levels. Examples 8, 10 and 11 also indicate that at a given maleic anhydride level the smoke evolution is lowered with increasing amounts of magnesium carbonate. A comparison of Examples 7 and 8 with Example 2 shows that at a level of 7 percent maleic anhydride, the epichlorohydrin rubber contributes to a better UL-94 rating.

EXAMPLES 19 to 21 (CONTROL)

These examples illustrate the use of a butadiene type rubber which is grafted with styrene-maleic anhydride in preparing styrene-maleic anhydride molding compositions. The diene rubber used is polybutadiene rubber. This material is available commercially as Diene 55 from the Firestone Rubber Company. Diene 55 is dissolved in a solution of styrene and maleic anhydride monomers. The mass polymerization of the solution is carried out with agitation until phase inversion occurs. The resulting syrup is then polymerized in mass at 105° C. for 78 hours. The graft polymer is then soaked in methanol, filtered and dried. This material is blended with various styrene-maleic anhydride matrices formulated with additives and tested as outlined above using the following formulation:

| SMA polymer matrix | 26.8 | parts |
|---|---|---|
| SMA grafted rubber | 50.2 | parts |
| Antimony oxide | 4 | parts |
| Decabromodiphenyl oxide | 9 | parts |
| Dawsonite | 5 | parts |
| Magnesium carbonate | 5 | parts |

The formulated materials are then tested for flame and smoke properties using the procedure outlined above. The results of these tests are tabulated in table IV below.

SUMMARY OF EXAMPLES 19 to 21

| Examples | 19 | 20 | 21 |
|---|---|---|---|
| % MA in SMA | 7 | 14 | 21 |
| UL-94 | Fail | V-1 | V-0 |
| AFOT (seconds) | Burns | 7 | 3 |
| Dm (Flaming) | 446 | 387 | 355 |

A comparison of the data in Table IV above with the previous rubber modified samples shows the advantages of using a halogenated rubber or an ethylene vinyl acetate rubber in order to obtain improved fire retardant properties at lower maleic anhydride levels. In the systems tested in the butadiene rubbers require a maleic anhydride level of at least 14 percent in order to obtain a V-1 rating. On the other hand, when using a halogenated rubber a V-1 rating is obtained when using 7 percent maleic anhydride.

The polymers of the present invention are useful for preparing a wide variety of molded objects such as radio and television cabinets, appliance housings, parts and components for vehicles, furniture and other related items.

Polymers of the present invention may be further modified with conventional additives and adjuvants such as fillers, plasticizers, U.V. stabilizers, heat stabilizers, antioxidants, etc. Care should be taken when formulating or compounding the polymers of the present invention so as not to adversely effect the flammability and/or smoke evolution properties of the polymers of the present invention.

What is claimed is:

1. A composition of matter having a UL-94 rating of at least V-1 and a Dm (flaming) of less than 450 which comprises:
    A. a rubber modified copolymer of a styrene monomer and maleic anhydride containing from 7 to 25 percent by weight, based on the weight of the copolymer of maleic anhydride; wherein the rubber is selected from the group consisting of polyepichlorohydrin rubbers, polychloroprene rubbers, chlorinated polyethylene rubbers and ethylene vinyl acetate rubbers; wherein the amount of rubber used is in the range of from 1 to 30 percent by weight based on the weight of the styrene-maleic anhydride copolymers; with the proviso that when using an ethylene vinyl acetate rubber the maleic anhydride content of the polymer is at least 10 percent by weight;
    B. from 7.5 to 15 percent by weight, based on the total weight of the composition, of an aromatic bromine compound which will provide at least 6 percent by weight of bromine to the composition;
    C. from 3 to 12 percent by weight, based on the total weight of the composition, of a metal oxide selected from the group consisting of $Sb_2O_3$, $Bi_2O_3$, $MoO_3$, $SnO_2$ and $WO_3$; and
    D. from 3 to 25 percent by weight, based on the total weight of the composition, of a smoke suppressant selected from the group consisting of dawsonite, magnesium carbonate, alumina trihydrate, calcium carbonate, magnesium borate and mixtures thereof.

2. A composition as in claim 1 wherein the styrene monomer is selected from the group consisting of styrene, chlorostyrene, alpha-methyl styrene and mixtures thereof.

3. A composition as in claim 1 wherein the aromatic bromine compound is decabromodiphenyl oxide.

4. A composition as in claim 1 wherein the metal oxide is antimony oxide.

5. A composition as in claim 1 wherein the smoke suppressant is a mixture of magnesium carbonate and wherein the ratio of magnesium carbonate to dawsonite is at least 1:1.

6. A composition as in claim 1 wherein the rubber component is selected from the group consisting of polyepichlorohydrin, polychloroprene and chlorinated polyethylene.

7. A composition as in claim 6 which contains from 5 to 20 percent by weight of polyepichlorohydrin rubber.

8. A composition of matter having a UL-94 rating of at least V-1 and a Dm (flaming) of less than 400 which comprises:
    A. a copolymer of a styrene monomer and maleic anhydride containing from 10 to 21 percent by weight, based on the weight of the copolymer of maleic anhydride, which is modified with from 5 to 20 percent by weight based on the weight of the styrene-maleic anhydride copolymer of a polyepichlorohydrin rubber;
    B. from 7.5 to 15 percent by weight, based on the total weight of the composition of an aromatic bromine compound which will provide at least 6 percent by weight of bromine to the composition;
    C. from 3 to 12 percent by weight, based on the total weight of the composition, of a metal oxide selected from the group consisting of $Sb_2O_3$, $Bi_2O_3$, $MoO_3$, $SnO_2$ and $WO_3$;
    D. from 5 to 20 percent by weight, based on the total weight of the composition of a smoke suppressant which is a mixture of magnesium carbonate and dawsonite wherein the ratio of magnesium carbonate to dawsonite is at least 1:1.

9. A composition as in claim 8 wherein the styrene monomer is selected from the group consisting of styrene, chlorostyrene, alpha-methyl styrene and mixtures thereof.

10. A composition as in claim 8 wherein the aromatic bromine compound is decabromodiphenyl oxide.

11. A composition as in claim 8 wherein the metal oxide is antimony oxide.

* * * * *